United States Patent
Blalock et al.

(10) Patent No.: US 11,914,621 B2
(45) Date of Patent: Feb. 27, 2024

(54) DETERMINING AN ASSOCIATION METRIC FOR RECORD ATTRIBUTES ASSOCIATED WITH CARDINALITIES THAT ARE NOT NECESSARILY THE SAME FOR TRAINING AND APPLYING AN ENTITY RESOLUTION MODEL

(71) Applicant: KOMODO HEALTH, San Francisco, CA (US)

(72) Inventors: Benjamin James Campbell Blalock, Astoria, NY (US); Alexander Graham Glenday, Brooklyn, NY (US); Jason Richard Prestinario, Brooklyn, CA (US)

(73) Assignee: KOMODO HEALTH, San Francisco, CA (US)

( * ) Notice: Subject to any disclaimer, the term of this patent is extended or adjusted under 35 U.S.C. 154(b) by 1047 days.

(21) Appl. No.: 16/406,267

(22) Filed: May 8, 2019

(65) Prior Publication Data
US 2020/0356816 A1  Nov. 12, 2020

(51) Int. Cl.
*G06F 16/28* (2019.01)
*G06N 20/00* (2019.01)
*G06F 18/214* (2023.01)
*G06F 18/22* (2023.01)

(52) U.S. Cl.
CPC .......... *G06F 16/285* (2019.01); *G06F 16/288* (2019.01); *G06F 18/2148* (2023.01); *G06F 18/22* (2023.01); *G06N 20/00* (2019.01)

(58) Field of Classification Search
CPC .. G06K 9/6257; G06K 9/6215; G06F 16/285; G06F 16/288; G06N 20/00
See application file for complete search history.

(56) References Cited

U.S. PATENT DOCUMENTS

| 2016/0071017 | A1* | 3/2016 | Adjaoute | G06Q 20/4016 706/52 |
| 2016/0180245 | A1* | 6/2016 | Tereshkov | G06N 20/00 706/12 |
| 2018/0137150 | A1* | 5/2018 | Osesina | G06F 16/215 |
| 2019/0205829 | A1* | 7/2019 | Abebe | G06K 9/6223 |

* cited by examiner

*Primary Examiner* — Mark D Featherstone
*Assistant Examiner* — Samuel C Sharpless, III
(74) *Attorney, Agent, or Firm* — Flaster Greenberg P.C.

(57) ABSTRACT

An association metric for record attributes associated with cardinalities that are not necessarily the same is used for training and/or applying an entity resolution (ER) model. A pair of records includes (a) a first record indicating a first set of values for a first attribute and (b) a second record indicating a second set of values for a second attribute. Each of the first set of values and each of the second set of values are compared to determine individual association metrics. A first-level reduction operation is applied to subsets of the individual association metrics to determine reduced association metrics. A second-level reduction operation is applied to the reduced association metrics to determine an association metric, for the pair of records, for training and/or applying an ER model.

20 Claims, 9 Drawing Sheets

US 11,914,621 B2

DETERMINING AN ASSOCIATION METRIC FOR RECORD ATTRIBUTES ASSOCIATED WITH CARDINALITIES THAT ARE NOT NECESSARILY THE SAME FOR TRAINING AND APPLYING AN ENTITY RESOLUTION MODEL

TECHNICAL FIELD

The present disclosure relates to training and applying an entity resolution (ER) model. In particular, the present disclosure relates to determining an association metric, for record attributes associated with cardinalities that are not necessarily the same, for training and applying an ER model.

BACKGROUND

Entity resolution (ER) is the task of identifying a set of records that are associated with a same entity. An entity is any object, person, and/or event. An entity may be, for example, a physician, a healthcare organization, or a clinical study. The set of records may be associated with different schemas. Additionally or alternatively, the set of records may be obtained from different data sources.

ER involves determining whether a particular pair of records are associated with a same entity. Features of a pair of records are extracted. Features of one record are compared against features of the other record to generate association metrics. The association metrics are input into an ER model. The ER model outputs a classification of the pair of records as being associated with the same entity or not being associated with the same entity.

An ER model may be generated using machine learning. Pairs of training records are pre-labeled as being associated with the same entity or not being associated with the same entity. Features of the pairs of training records are extracted. Features of one training record are compared against features of another training record to generate association metrics. A set of association metrics, for the training records, are input into a machine learning algorithm. The machine learning algorithm outputs an ER model.

In some cases, two attributes, or fields, of two different schemas may be associated with a same data type but different meanings. As an example, two schemas may include a name attribute. However, one schema's name attribute may reference a name of a physician. The other schema's name attribute may reference a name of a manager or director. Further, a single case may involve many physicians but only one manager. Hence, records of one schema may include a long list of physician names, while records of the other schema may include at most one manager name. As another example, two schemas may include a location attribute. However, one schema's location attribute may reference a primary practice address of a physician. The other schema's location attribute may reference a site address of a clinical trial. In such cases, conventional algorithms for determining an association metric for the two attribute might not generate results that correlate with whether the pair of records are associated with the same entity.

In some cases, two data sources may attempt to collect the same information but use different collection methods. The records generated by the two data sources may include disparate levels of information, or even contradictory information. As an example, two data sources may attempt to collect information on the health professionals that a patient sees during a visit. One data source may include information on every health professional that is seen, including nurses, doctors, and medical interns. Records generated by the data source may include a health professional attribute. The health professional attribute may be populated by a large number of names corresponding to every health professional that was seen. Another data source may include information on doctors only. Records generated by the data source may include a health professional attribute. The health professional attribute may include only a few names of the doctors that were seen. As another example, two data sources may attempt to collect information on contact information of doctors. One data source may be associated with a strict checklist for collecting the contact information. Records generated by the data source may include comprehensive contact information for each doctor. Another data source may be associated with a lax policy for collecting the contact information. Records generated by the data source may include only sparse information. In such cases, conventional algorithms for determining an association metric for the two attribute might not generate results that correlate with whether the pair of records are associated with the same entity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
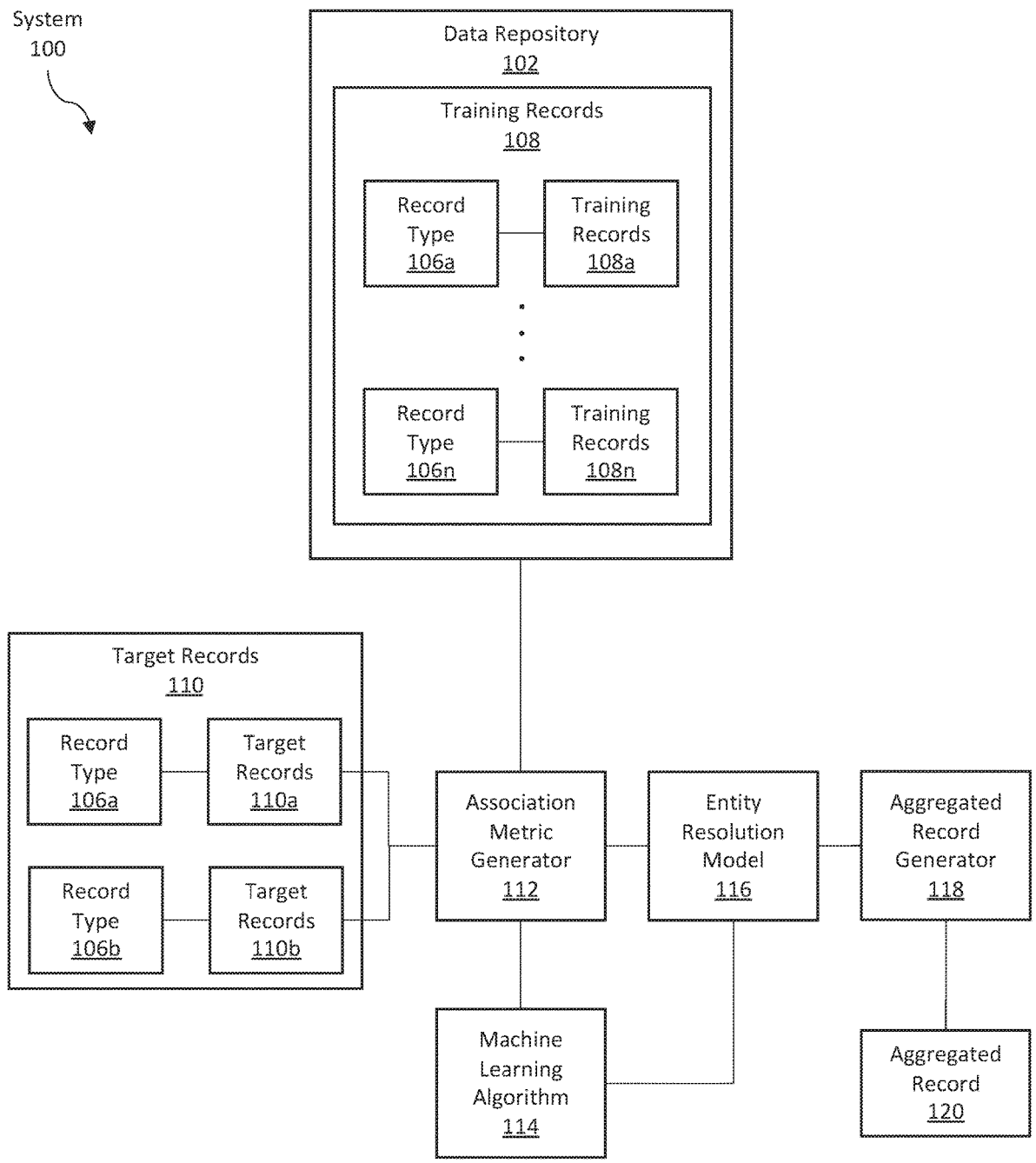
FIG. 1 illustrates an entity resolution system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ENTITY RESOLUTION SYSTEM ARCHITECTURE
3. GENERATING AND APPLYING AN ENTITY RESOLUTION MODEL
4. DETERMINING AN ASSOCIATION METRIC
5. EXAMPLE EMBODIMENT
6. HARDWARE OVERVIEW
7. MISCELLANEOUS; EXTENSIONS

1. General Overview

One or more embodiments include determining an association metric between a first set of values corresponding to a first attribute of a first record and a second set of values corresponding to a second attribute of a second record, wherein the first attribute and the second attribute may be "mismatched." Examples of mismatched record attributes include, for example, record attributes associated with the same data type but different meanings, record attributes populated by data obtained through different collection methods, and/or record attributes of records of different record types. Since the first attribute and the second attribute may be "mismatched," a first cardinality of the first set of values and a second cardinality of the second set of values are not necessarily the same.

A system compares each of the first set of values and each of the second set of values to obtain a set of individual association metric. A particular individual association metric corresponds to an association between (a) a particular value of the first set of values and (b) a particular value of the second set of values. The system then performs two levels of reduction on each individual association metric. First, the system identifies groups of individual association metrics associated with each respective value of the first set of values. The system applies a first-level reduction operation to reduce each group of individual association metrics across the second set of values. Hence, each group of individual association metrics are reduced into a single reduced association metric. A particular reduced association metric corresponds to an association between (a) a particular value of the first set of values and (b) all of the second set of values. Second, the system applies a second-level reduction operation to reduce the reduced association metrics across the first set of values. Hence, the reduced association metrics are reduced into a single mismatched-attribute association metric. The mismatched-attribute association metric (also referred to simply as an "association metric") corresponds to an association level between (a) all of the first set of values of the first attribute of the first record and (b) all of the second set of values of the second attribute of the second record. The mismatched-attribute association metric represents an association between (a) all of the first set of values of the first attribute of the first record and (b) all of the second set of values of the second attribute of the second record, even if the first cardinality of the first set of values and the second cardinality of the second set of values are not necessarily the same.

One or more embodiments include determining a mismatched-attribute association metric for training an entity resolution (ER) model using a machine learning algorithm. Pairs of training records are obtained. A set of association metrics are determined for each pair of training records. The set of association metrics includes a mismatched-attribute association metric, as described above. A machine learning algorithm is applied to the sets of association metrics corresponding to the pairs of training records. Based on the machine learning algorithm, an ER model is generated.

One or more embodiments include determining a mismatched-attribute association metric for applying an ER model to determine whether a pair of target records are associated with a same entity. A pair of target records are obtained. A set of association metrics are determined for the pair of target records. The set of association metrics includes a mismatched-attribute association metric, as described above. An ER model is applied to the set of association metrics corresponding to the pair of target records. Based on the ER model, a probability that the pair of target records are associated with the same entity is determined.

One or more embodiments described in this Specification and/or recited in the claims may not be included in this General Overview section.

2. Entity Resolution System Architecture

FIG. 1 illustrates an entity resolution system, in accordance with one or more embodiments. As illustrated in FIG. 1, a system 100 includes a data repository 102, training records 108, target records 110, an association metric generator 112, a machine learning algorithm 114, an entity resolution (ER) model 116, an aggregated record generator 118, and an aggregated record 120. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a data repository 102 is any type of storage unit and/or device (e.g., a file system, database, collection of tables, or any other storage mechanism) for storing data. Further, a data repository 102 may include multiple different storage units and/or devices. The multiple different storage units and/or devices may or may not be of the same type or located at the same physical site. Further, a data repository 102 may be implemented or executed on the same computing system as an association metric generator 112, machine learning algorithm 114, entity resolution model 116, and/or aggregated record generator 118. Alternatively or additionally, a data repository 102 may be implemented or executed on a computing system separate from an association metric generator 112, machine learning algorithm 114, entity resolution model 116, and/or aggregated record generator 118. The data repository 102 may be communicatively coupled to the association metric generator 112, machine learning algorithm 114, entity resolution model 116, and/or aggregated record generator 118 via a direct connection or via a network.

Information describing training records 108 may be implemented across any of components within the system 100. However, this information is illustrated within the data repository 104 for purposes of clarity and explanation.

In one or more embodiments, training records 108 are records used for training an ER model 116 using a machine learning algorithm 114. A training record 108 includes a set of structured data and/or a set of unstructured data. Structured data is stored and/or managed in accordance with a schema. A schema is associated with one or more record attributes, or fields. A record attribute may be populated by zero, one, or more data values. As an example, a name attribute may be populated by a person's name. A name attribute of one record may include "David Smith." A name attribute of another record may include "Daniel." A name attribute of another record may include "Katherine (Kate) Ashley Brown." Unstructured data is not stored in accordance with any schema. Examples of unstructured data include narrative text. Unstructured data may be processed to be stored as structured data. Content of unstructured data corresponding to attributes of a schema may be identified and extracted. The extracted content may be stored in association with the corresponding attributes in a structured data set in accordance with the schema.

Different training records 108 may be associated with different record types. As illustrated, for example, training records 108a may be associated with record type 106a; training records 108n may be associated with record type 106n. A record type may refer to a source of records, a data collection method associated with records, and/or any grouping or categorization of records.

As an example, one type of records includes records managed by the National Plan & Provider Enumeration System (NPPES). The NPPES provides a National Provider Identifier (NPI) registry. The NPI registry includes a set of physician records. Each physician record may include, for example, an NPI of a physician, a physician name, a primary practice address, a mailing address, and/or a specialty area.

As another example, another type of records includes records managed by the Centers for Medicare and Medicaid Services (CMS). The CMS provides an Open Payments registry. The Open Payments registry includes a set of payment records. Each payment record may include, for example, a Physician Profile Identifier (PPI) of a physician, a physician name, a physician address, a provider name, a provider address, a payment amount, a payment date, a payer, a name of research study being funded by the payment, and/or a principal investigator associated with the research study.

As another example, another type of records includes records managed by the U.S. National Library of Medicine. The National Library of Medicine provides a Clinical Trials registry. The Clinical Trials registry includes a set of research study records. Each research study record includes, for example, a name of research study, physician name(s), and/or research study site address(es).

Each training record 108 is associated with a label indicating an entity associated with the training record 108. Any object, person, and/or event may be used as an "entity" for entity resolution purposes.

As an example, a record from the NPI registry may include an NPI of a physician. A record from the Open Payments registry may include a PPI of the same physician. The two records may be associated with labels indicating that the two records are associated with the same physician.

Figure 2:
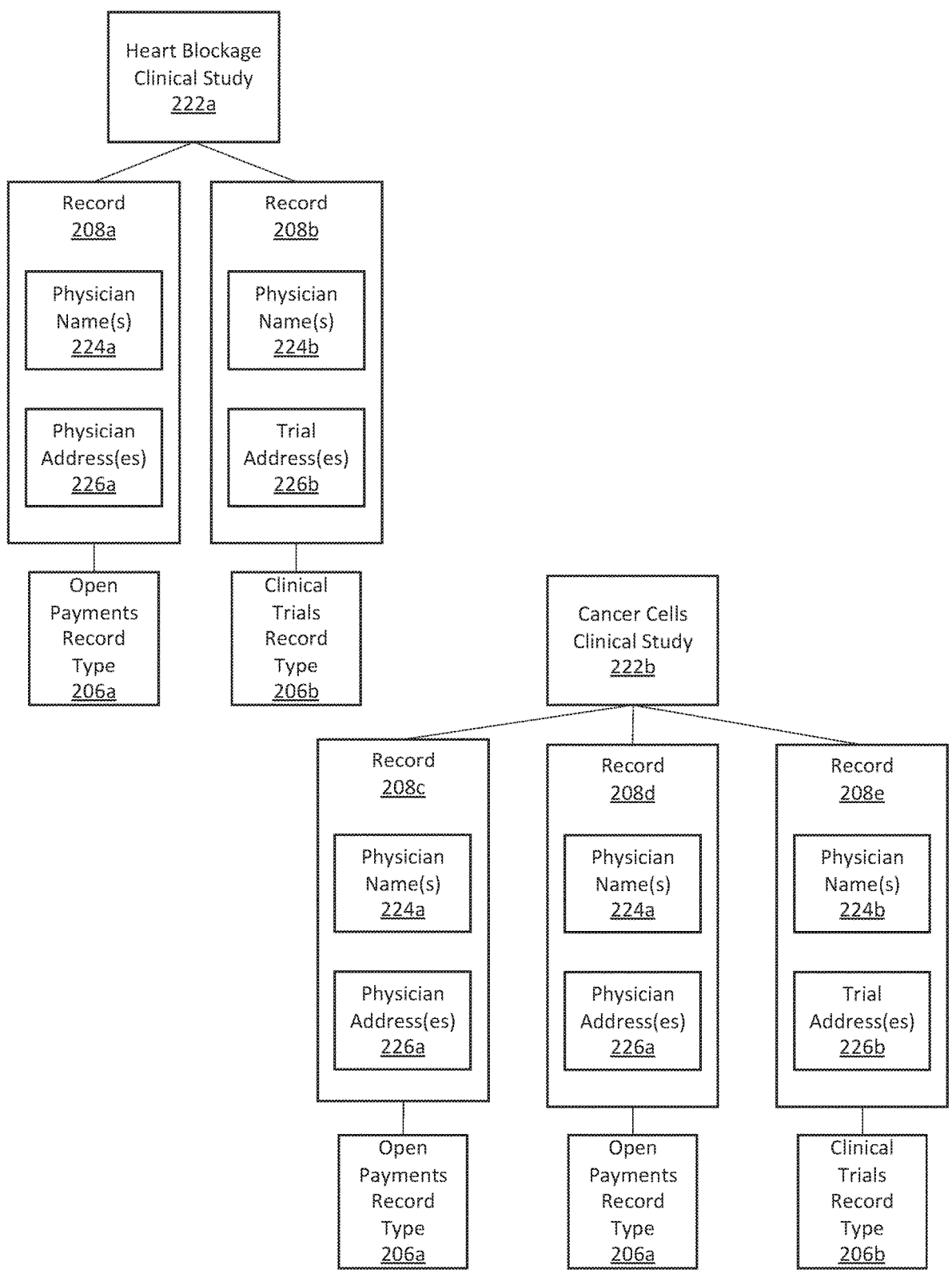
FIG. 2 illustrates example records of different record types and associated entities, in accordance with one or more embodiments.

As another example, FIG. 2 illustrates example records of different record types and associated entities.

Record 208a, record 208c, and record 208d are associated with an Open Payments record type 206a. Record 208a, record 208c, and record 208d are records from the Open Payments registry. Meanwhile, record 208b and record 208e are associated with a Clinical Trials record type 206b. Record 208b and record 208e are records from the Clinical Trials registry. Records of record type 206a and records of record type 206b are organized in accordance with different schemas.

The schema of record type 206a (associated with record 208a, record 208c, and record 208d) includes a physician name attribute. The physician name attribute includes zero, one, or more physician names. The physician name attribute identifies physicians who received payment in a particular transaction.

The schema of record type 206a further includes a physician address attribute. The physician address attribute includes zero, one, or more physician addresses. The physician address attribute identifies work addresses of physicians identified in the physician name attribute.

The schema of record type 206b (associated with record 208b and record 208e) includes a physician name attribute. The physician name attribute includes zero, one, or more physician names. The physician name attribute identifies physicians who were involved in a particular clinical study.

The schema of record type 206b further includes a trial address attribute. The trial address attribute includes zero, one, or more trial addresses. The trial address attribute identifies locations where trials associated with the particular clinical study took place.

Record 208a stores transaction information associated with a Heart Blockage Clinical Study 222a. A transaction may be, for example, payment of funding from a certain organization to support the Heart Blockage Clinical Study 222a. Meanwhile, record 208b stores research information associated with the Heart Blockage Clinical Study 222a. A user and/or an application may label and/or tag each of record 208a and record 208b to indicate that the records are associated with the Heart Blockage Clinical Study 222a.

Similarly, records 208c-e may be associated with a Cancer Cells Clinical Study 222b. A user and/or an application may label and/or tag each of records 208c-e to indicate that the records are associated with the Cancer Cells Clinical Study 222b.

The labeled records 208a-e may be used as training records to train an ER model.

Referring back to FIG. 1, in one or more embodiments, target records 110 are records to be classified as either referencing a same entity or referencing different entities. Target records 110 are records to which an ER model 116 is applied. Just like training records 108, a target record 110 includes a set of structured data and/or a set of unstructured data. Further, different target records 110 may be associated with different record types 106. As illustrated, for example, target record 110a may be associated with record type 106a; target record 110b may be associated with record type 106b. Unlike training records 108, however, target records 110 are not associated with any labels. An ER model 116 is used to determine an entity associated with a target record 110.

Target records 110 associated with different schemas and/or different record types may reference a same entity. As an example, a record from an Open Payment registry may include a physician name attribute and a physician address attribute. A record from a Clinical Trial registry may include a physician name attribute and a trial address attribute. The Open Payment record for a payment transaction for a particular clinical study may indicate (a) a name of a physician who received the payment, and (b) a work address of the physician. The Clinical Trial record for the particular study may indicate (a) names of all physicians involved in the study, and (b) addresses of where trials took place. Hence, the physician name attribute of the Open Payment record and the physician name attribute of the Clinical Trial record are associated with the same data type (a name) but do not have exactly the same meaning. The physician address attribute of the Open Payment record and the trial address attribute of the Clinical Trial record are associated with the same data type (an address) but do not have exactly the same meaning.

Even though the physician name attribute of the Open Payment record and the physician name attribute of the Clinical Trial record are mismatched, an association metric for the two name attributes may be determined. The association metric may be input into an ER model. Further, even though the physician address attribute of the Open Payment record and the trial address attribute of the Clinical Trial record are mismatched, an association metric for the two address attributes may be determined. The association metric may also be input into the ER model. Based on the association metrics, the ER model may determine whether the two records are referencing the same clinical trial or referencing different clinical trials.

In one or more embodiments, an association metric generator 112 refers to hardware and/or software configured to perform operations described herein for determining an association metric for use in an ER model 116. Examples of operations for determining an association metric for use in an ER model 116 are described below with reference to FIGS. 4 and 5A-B.

In one or more embodiments, a machine learning algorithm 114 is an algorithm that can be iterated to learn a target model f that best maps a set of input variables to an output variable. In particular, a machine learning algorithm 114 refers to hardware and/or software configured to generate and/or train an ER model 116. A machine learning algorithm 114 generates an ER model 116 such that the ER model 116 best fits the association metrics of training records 108 to the labels of the training records 108. Additionally or alternatively, a machine learning algorithm 114 generates an ER model 116 such that when the ER model 116 is applied to the association metrics of training records 108, a maximum number of results determined by the ER model 116 (that is, various entities determined as being associated with the training records) matches the labels of the training records 108.

A machine learning algorithm 114 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, and/or boosting.

In one or more embodiments, an ER model 116 refers to hardware and/or software configured to determine whether two or more target records 110 are associated with the same entity. Association metrics of target records 110 are input into an ER model 116. The ER model 116 determines a classification of the target records 110 as referencing the same entity or referencing different entities. The ER model 116 may determine a probability that the target records 110 as referencing the same entity or referencing different entities. If the probability is above a threshold value, then the target records 110 are determined as referencing the same entity. Conversely if the probability is below the threshold value, then the target records 110 are determined as referencing different entities.

An ER model 116 may include any of a variety of classification models. Examples of classification models include a random forest model, a logistic regression model, a naïve Bayes model, a support vector machine, and/or other models.

In one or more embodiments, an aggregated record generator 118 refers to hardware and/or software configured to aggregate two or more target records 110 that are associated with the same entity. An aggregated record generator 118 generates an aggregated record 120 based on two or more target records 110 associated with the same entity. The aggregated record 120 includes information from each target record 110 associated with the same entity. In an embodiment, an aggregated record 120 is presented on a user interface to a user.

In one or more embodiments, an association metric generator 112, a machine learning algorithm 114, an ER model 116, and/or an aggregated record generator 118 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

3. Generating and Applying an Entity Resolution Model

Figure 3:
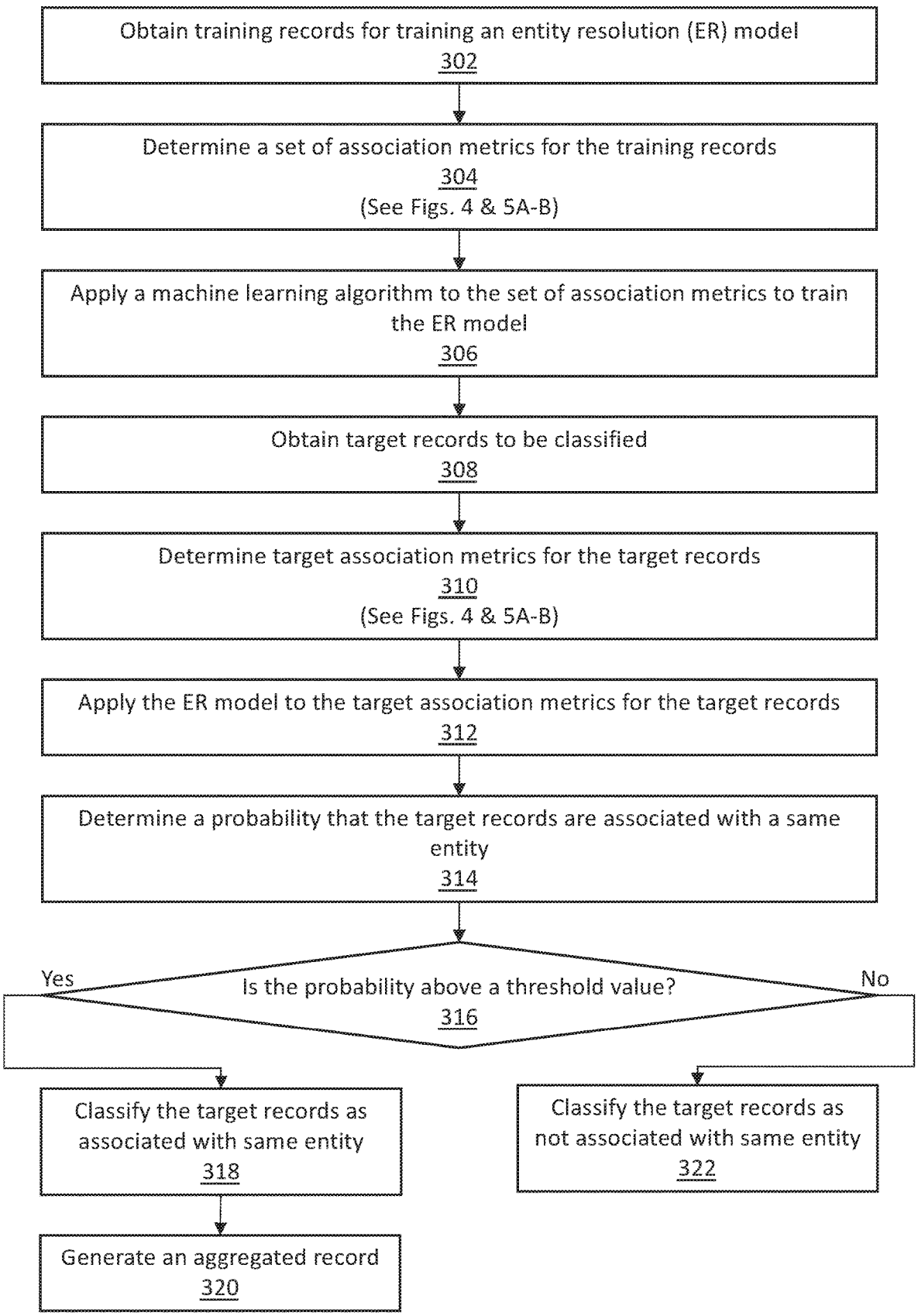
FIG. 3 illustrates an example set of operations for training and applying an entity resolution model, in accordance with one or more embodiments.

FIG. 3 illustrates an example set of operations for training and applying an entity resolution model, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include obtaining training records for training an entity resolution (ER) model (Operation 302). A system obtains training records for training an ER model. The training records are labeled to indicate groups of records associated with the same entity.

As an example, a user may download one set of records from one database. The user may download another set of records from another database. The user may manually review the records from the two databases to determine which records are associated with the same entity. The user may assign an entity identifier (ID) to each entity. The user may label each record with the entity ID corresponding to the associated entity. The user may store the records and the labels in a data repository. A system may obtain the records and the labels from the data repository.

One or more embodiments include determining a set of association metrics for the training records (Operation 304). The system determines association metrics for the training records. The system determines different association metrics for various attributes and/or fields associated with the training records. An association metric represents an association level between values of attributes of different records. As an example, a system may determine one association metric for a name attribute of a first record and a name attribute of a second record. The system may determine another association metric for a creation time of the first record and a creation time of the second record. The system may determine another association metric for a transaction count for the first record and a transaction count for the second record. Hence, the system may determine multiple association metrics for two records.

In an embodiment, the system identifies pairs of training records and processes each pair of training records to determine association metrics for each pair. As an example, a set of training records may include Record A, Record B, Record C, and Record D. A system may identify the following pairs of training records: Record A-Record B;

Record A-Record C; Record A-Record D; Record B-Record C; Record B-Record D; and Record C-Record D. The system may determine association metrics for each pair of training records. Hence, association metrics for Record A-Record B may be determined; association metrics for Record A-Record C may be determined; association metrics for Record A-Record D may be determined; and so on. All the association metrics for the pairs of training records may be referred to as a "set of association metrics for the training records."

In an embodiment, the system determines a mismatched-attribute association metric. The mismatched-attribute association metric may be used for attributes of different records that are not necessarily matched. The attributes may be associated with different meanings. Additionally or alternatively, the attributes may be populated by data collected using different collection methods. Additionally or alternatively, the cardinalities associated with the attributes are not necessarily the same. Examples of operations for determining an association metric for attributes that are not necessarily matched are described below with reference to FIGS. 4 and 5A-B.

One or more embodiments include applying a machine learning algorithm to the set of association metrics to train the ER model (Operation 306). The system applies a machine learning algorithm to the set of association metrics. Based on the machine learning algorithm, the system generates an ER model such that the ER model best fits the association metrics of training records to the labels of the training records. Additionally or alternatively, based on the machine learning algorithm, the system generates an ER model such that when the ER model is applied to the association metrics of training records, a maximum number of results determined by the ER model (that is, various entities determined as being associated with the training records) matches the labels of the training records.

One or more embodiments include obtaining target records to be classified (Operation 308). The system obtains target records to be classified by the ER model. The system may obtain the target records from different data sources. As an example, a target record may be obtained from an NPI registry, while another target record may be obtained from an Open Payments registry.

One or more embodiments include determining target association metrics for the target records (Operation 310). The system determines target association metrics for the target records. Examples of operations for determining association metrics for records are described above with reference to Operation 304. Further examples of operations for determining an association metric for attributes that are not necessarily matched are described below with reference to FIGS. 4 and 5A-B.

One or more embodiments include applying the ER model to the target association metrics for the target records (Operation 312). The system applies the ER model (determined at Operation 306) to the target association metrics for the target records. The target association metrics are input into the ER model.

One or more embodiments include determining a probability that the target records are associated with a same entity (Operation 314). Based on the ER model, the system determines a probability that the target records are associated with a same entity.

One or more embodiments include determining whether the probability is above a threshold value (Operation 316). The system compares a probability that the target records are associated with the same entity with a threshold value.

If the probability is above the threshold value, one or more embodiments include classifying the target records as associated with the same entity (Operation 318). The system classifies the target records as associated with the same entity. The system may assign a same entity ID to each of the target records associated with the same entity.

One or more embodiments include generating an aggregated record (Operation 320). The system compares and merges information from the target records associated with the same entity. Merging the target records may include determining whether the target records include attributes associated with the same meaning. For attributes of the two target records that are associated with the same meaning, the system determines whether the values for the same attribute indicated by the two target records conflict. If there is conflict, the system may determine to include the value indicated by only one of the two target records into an aggregated record. If there is no conflict, the system may determine to include all values indicated by the two target records into the aggregated record. Meanwhile, for an attribute of a particular target record that does not have the same meaning as any attribute of the other target record, the system may include the attribute and the values indicated by the particular target record into the aggregated record.

As an example, two target records may be determined as being associated with a same clinical study (a same entity).

One target record may include an attribute for a physician name and an attribute for a funding amount, as follows:
Physician Name: William Smith
Funding Amount: $10,000

The other target record may include an attribute for a physician name and an attribute for research results, as follows:
Physician Name: Bill Smith
Research Results: 50% of patients on tested drug had positive results; 30% of patients on placebo had positive results A system may attempt to merge the two target records. The system may determine that the physician name attributes of the two target records are associated with the same meaning. The system may determine that one record indicates the name "William Smith," and the other record indicates the name "Bill Smith." The system may determine that there is a conflict between the two names ("Bill" is a short form of "William"). The system may determine to include only "William Smith" in an aggregated record, without including "Bill Smith."

The system may determine that the funding amount attribute of one target record is not included in the other target record. The system may include the funding amount of $10,000 in the aggregated record.

The system may determine that the research results attribute of one target record is not included in the other target record. The system may include the research results in the aggregated record. The aggregated record may indicate the research results as "50% of patients on tested drug had positive results; 30% of patients on placebo had positive results."

Additional and/or alternative ways of merging and/or aggregating target records into an aggregated record may be used.

By performing entity resolution on the target records, the system determines whether the information indicated by the target records is associated with a same entity. Based on target records associated with a same entity, a user of the system may gain a comprehensive set of information about the entity. The comprehensive set of information is not discernable from each individual target record itself.

In an embodiment, a user may request, via a user interface, information associated with a particular entity. The request does not necessarily identify any target records associated with the particular entity. Yet, in response to the request, an aggregated record including information from multiple target records associated with the particular entity may be identified. The aggregated record, including the comprehensive set of information from the multiple target records, may be presented on the user interface.

If the probability is not above the threshold value, one or more embodiments include classifying the target records as not associated with the same entity (Operation 322). The system classifies the target records as not associated with the same entity. The system does not aggregate the target records.

In one or more embodiments, a large number of target records may need to be classified. As an example, an NPI registry and an Open Payments registry may be downloaded. The records of the NPI registry and the Open Payments registry may need to be classified. The system identifies pairs of target records and iterates Operations 308-316 with respect to each pair of records.

As an example, target records to be classified may include a large number of NPI records and a large number of Open Payments records. A system may obtain a first NPI record and a first Open Payments record. The system may perform Operations 310-316 with respect to the first NPI record and the first Open Payments record. The system may classify the two records as being associated with the same entity at Operation 318. The system may then obtain the first NPI record and a second Open Payments record. The system may perform Operations 310-316 with respect to the first NPI record and the second Open Payments record. The system may classify the two records as being associated with the same entity at Operation 318. The system may thus iterate Operations 308-316 with respect to each pair of target records. For each pair, the system may classify the pair either as associated with the same entity at Operation 318 or as not associated with the same entity at Operation 322. The system may aggregate each group of target records associated with the same entity into a respective aggregated record at Operation 320.

4. Determining an Association Metric

Figure 4:
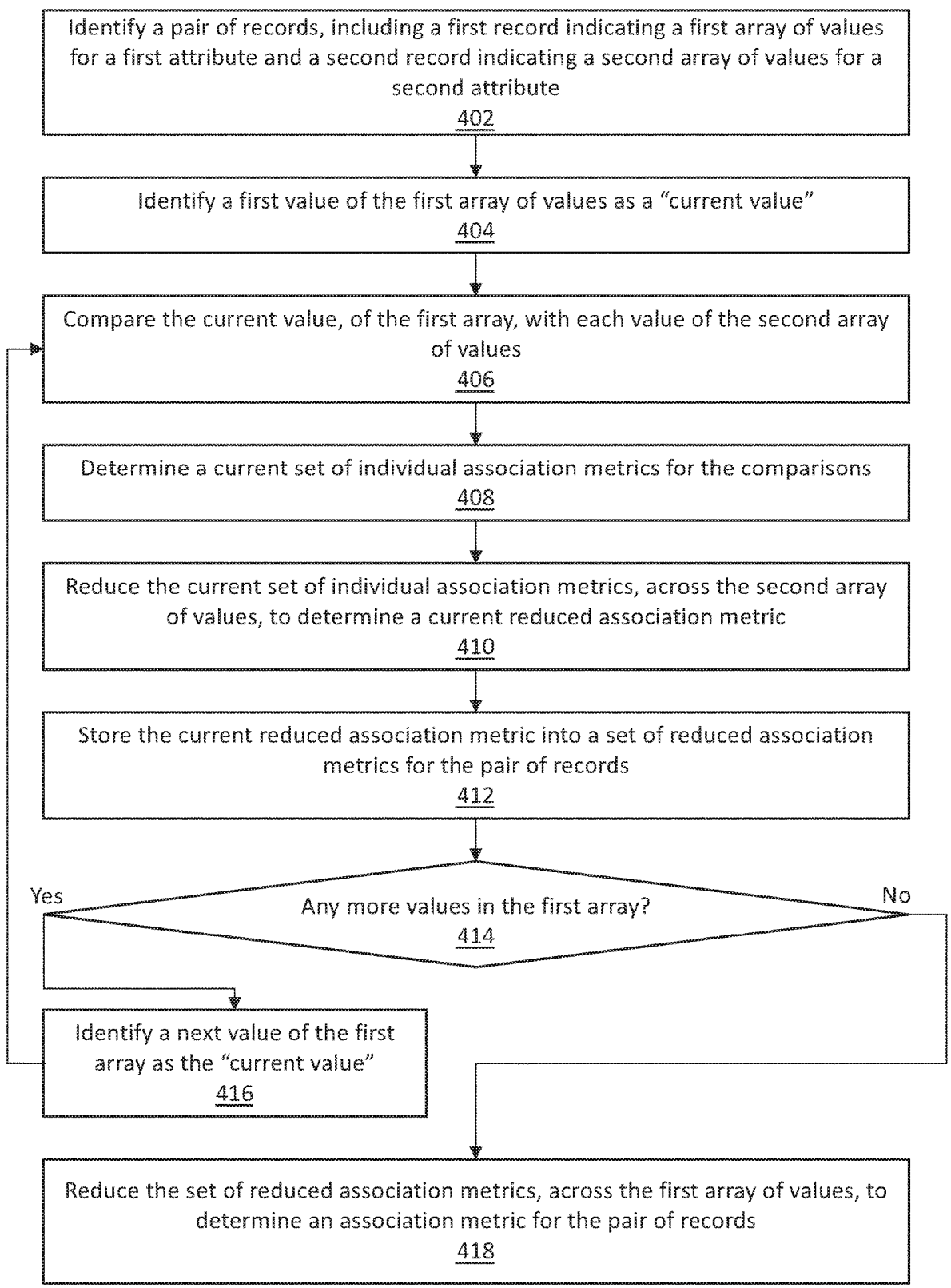
FIG. 4 illustrates an example set of operations for determining an association metric for use in an entity resolution model, in accordance with one or more embodiments.

FIG. 4 illustrates an example set of operations for determining an association metric for use in an entity resolution model, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include identifying a pair of records (Operation 402). A system identifies a pair of records. The records may be training records obtained at Operation 302 of FIG. 3. Alternatively, the records may be target records obtained at Operation 308 of FIG. 3. The pair of records includes a first record indicating a first array of values for a first attribute and a second record indicating a second array of values for a second attribute. The term "array" as used herein does not necessarily indicate the use of any specific data structure but may be used to refer to any "set" or "group" or "list" of values.

As an example, a system may identify two records. One record may include an office address attribute, indicating the office addresses of a business. The office address attribute may be populated with an array of values, "12 Main St., Concord, MA," and "34 Broadway Dr., Ithaca, NY." Another record may include a payment address attribute, indicating locations where a business received payment. The payment address attribute may be populated with an array of values, "14 Edgewood Way, Concord, MA," "12 Main St., Concord, MA," and "23 Ravenwood St., Ithaca, NY."

In an embodiment, the system determines which of the pair of records is associated with a smaller cardinality. The record associated with the smaller cardinality is referred to as the "first record." The record associated with the greater cardinality is referred to as the "second record." Hence, a first cardinality of the first array of values of the first record is smaller than a second cardinality of the second array of values of the second record. As further described below, the system iterates Operations 406-416 with respect to each value of the first array of values. By identifying the pair of records such that the "first record" is associated with the smaller cardinality, the system minimizes the number of iterations of Operations 406-416.

Referring to the example above, one record includes an office address attribute and another record includes a payment address attribute. The cardinality of the array of values in the office address attribute is two. The cardinality of the array of values in the payment address attribute is three. Hence, the record including the office address attribute is associated with a smaller cardinality. The system may refer to the record including the office address attribute as the "first attribute," and the record including the payment address attribute as the "second record."

One or more embodiments include identifying a first value of the first array of values as a "current value" (Operation 404). The system identifies a first value of the first array of values. The first value may be referred to as a "current value."

One or more embodiments include comparing the current value, of the first array, with each value of the second array (Operation 406). The system compares the current value with each value of the second array of values.

Referring to the example above, one record includes an office address attribute and another record includes a payment address attribute. The system may identify "12 Main St., Concord, Mass." (of the office address attribute) as a "current value." The system may perform the following comparisons with each value in the payment address attribute: "12 Main St., Concord, MA." and "14 Edgewood Way, Concord, MA."; "12 Main St., Concord, MA." and "12 Main St., Concord, MA."; and "12 Main St., Concord, MA." and "23 Ravenwood St., Ithaca, NY."

One or more embodiments include determining a current set of individual association metrics for the comparisons (Operation 408). The system may apply various algorithms for comparing two values to obtain an individual association metric.

As an example, two values being compared may be locations. A system may determine a straight-line distance between the two locations. Alternatively, the system may determine a driving distance between the two locations. The straight-line distance or the driving distance may be an individual association metric for the two values.

As another example, two values being compared may be names. A system may a name matching algorithm to the two names. Examples of name matching algorithms include, for example, the Levenshtein distance, the Jaro-Winkler distance, and the Jaccard similarity coefficient. The output of the name matching algorithm may be an individual association metric for the two values.

As another example, two values being compared may be textual datasets. A system may apply a cosine similarity algorithm to the textual datasets. The output of the cosine similarity algorithm may be an individual association metric for the two values.

Additional and/or alternative algorithms for comparing two values may be used.

The system determines an individual association metric for each comparison. The current set of individual association metrics, corresponding to the comparisons, represents a respective association level between the current value and each of the second array of values.

Referring to the example above, one record includes an office address attribute and another record includes a payment address attribute. The system may obtain the following set of individual association metrics:

TABLE 1

| Comparison | Individual Association Metric |
|---|---|
| "12 Main St., Concord, MA" and "14 Edgewood Way, Concord, MA" | 10 |
| "12 Main St., Concord, MA" and "12 Main St., Concord, MA" | 0 |
| "12 Main St., Concord, MA" and "23 Ravenwood St., Ithaca, NY" | 262 |

One or more embodiments include reducing the current set of individual association metrics, across the second array of values, to determine a current reduced association metric (Operation 410). The system reduces the current set of individual association metrics across the second array of values. Reducing the current set of individual association metrics may be referred to as a "first-level reduction operation." The system thereby determines a current reduced association metric. The current reduced association metric represents an association level between the current value and all of the second array of values.

The system may apply various algorithms for the first-level reduction operation. Examples of reduction algorithms include:
    selecting a minimum individual association metric out of the current set of individual association metrics;
    selecting a maximum individual association metric out of the current set of individual association metrics; and/or
    determining an average individual association metric based on the current set of individual association metrics.

Additional and/or alternative algorithms for reducing the current set of individual association metrics may be used.

As an example, values being compared may be locations. An individual association metric may represent a distance between two locations. A first-level reduction operation for reducing a set of individual association metrics may including selecting an individual association metric that represents the "best" match between two locations. The individual association metric that represents the "best" match between two locations is the minimum individual association metric out of the set of individual association metrics. Hence, the system may determine that the minimum individual association metric, out of the set of individual association metrics, is a reduced association metric.

One or more embodiments include storing the current reduced association metric into a set of reduced association metrics for the pair of records (Operation 412). The system stores the current reduced association metric into a set of reduced association metrics for the pair of records. Through each iteration of Operations 406-412 with respect to each of the first array of values, the system compiles another reduced association metric into the set of reduced association metrics.

One or more embodiments include determining whether there are any more values in the first array to be processed (Operation 414). The system determines whether there are any more values in the first array of values to be processed.

If there is at least one more value in the first array to be processed, one or more embodiments include identifying a next value of the first array of values as the "current value" (Operation 416). The system identifies a value of the first array that has not been processed as the "current value."

The system then iterates Operations 406-412 with respect to the current value. Hence, the system obtains a reduced association metric associated with each of the first array of values. The system thereby compiles a set of reduced association metrics for the pair of records.

If there are no more values in the first array to be processed, one or more embodiments include reducing the set of reduced association metrics, across the first array of values, to determine an association metric for the pair of records (Operation 418). The system reduces the set of reduced association metrics across the first array of values. Reducing the set of reduced association metrics may be referred to as a "second-level reduction operation." The second-level reduction operation is applied to a set of metrics that have already been previously reduced. The system thereby determines an association metric, for the pair of records, that may be input into an ER model for determining whether the pair of records reference the same entity. The association metric may also be referred to as a "mismatched-attribute association metric." The association metric represents an association level between all of the first array of values and all of the second array of values.

The system may apply various algorithms for the second-level reduction operation. An example of an algorithm for reducing a set of reduced association metrics includes determining a count of any reduced association metric that does not satisfy a criteria. The criteria may require that a reduced association metric be above a threshold value. Alternatively, the criteria may require that a reduced association metric be below a threshold value. A user and/or an application may specify the threshold value.

The system compares each of the set of reduced association metrics to the criteria. The system determines a count of any reduced association metric that does not satisfy the criteria. The system then normalizes the count based on a first cardinality of the first array of values and/or a second cardinality of the second array of values. Normalization may include, for example, dividing the count by the sum of the first cardinality and the second cardinality, or dividing the count by a number of combinations of the first array of values and the second array of values. The system determines the normalized count as a mismatched-attribute association metric for the pair of records.

Figure 5A:
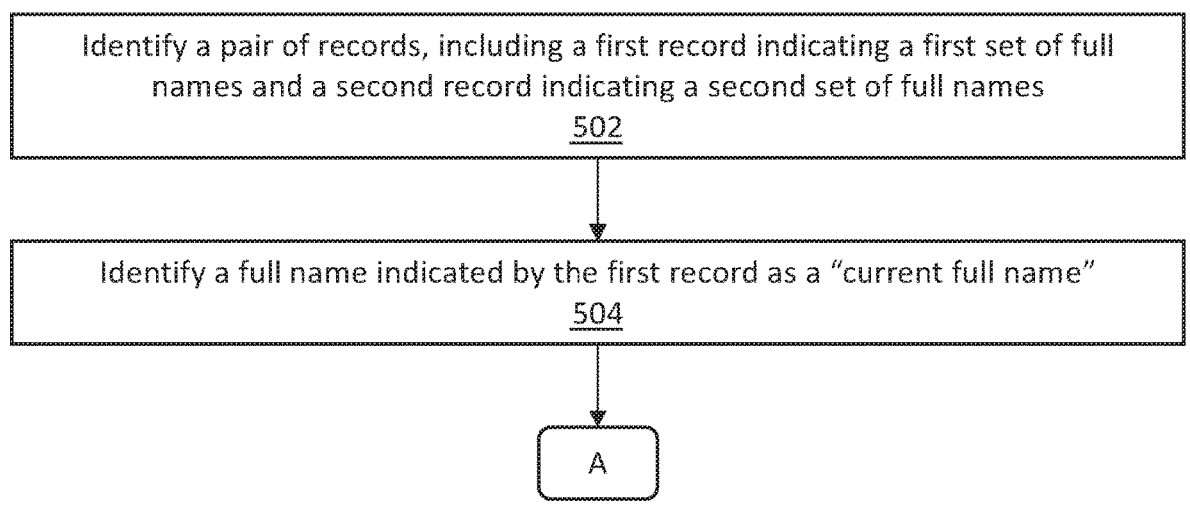
FIGS. 5A-B illustrate another example set of operations for determining an association metric for use in an entity resolution model, in accordance with one or more embodiments.
Figure 5B:
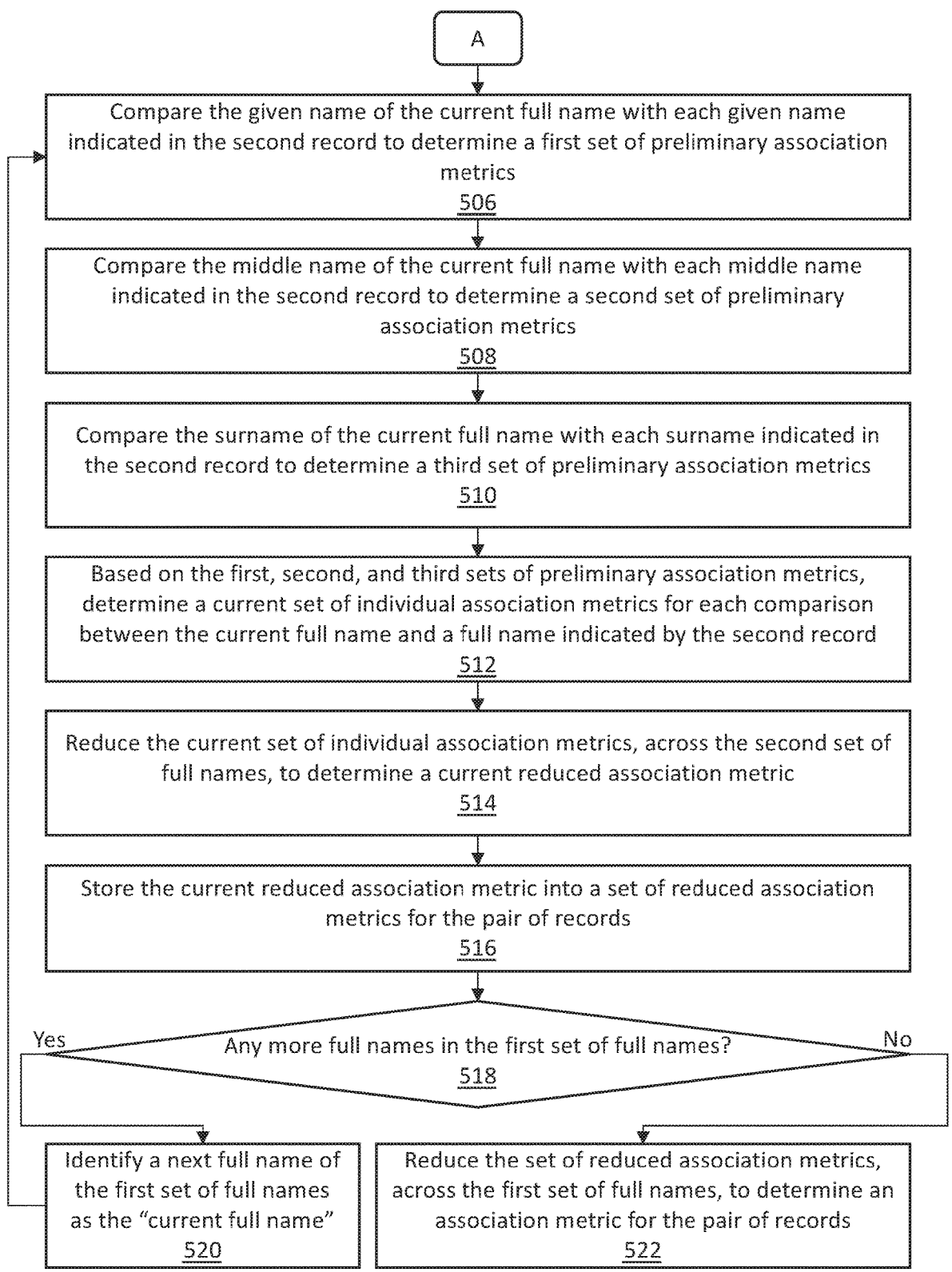

FIGS. 5A-B illustrate another example set of operations for determining an association metric for use in an entity resolution model, in accordance with one or more embodiments. One or more operations illustrated in FIGS. 5A-B may be modified, rearranged, or omitted all together. Accordingly, the particular sequence of operations illustrated in FIGS. 5A-B should not be construed as limiting the scope of one or more embodiments.

Operations of FIG. 4 and FIGS. 5A-B are similar, except that FIGS. 5A-B applies where the attributes of the records are further sub-dividable. The attribute may be referred to as having multiple "portions." As an example, an attribute of a record may be a full name. The full name attribute is further sub-dividable into smaller portions. The full name attribute may be divided into three portions: a given name attribute, a middle name attribute, and a surname attribute. If a full name attribute is included in two records, then operations of FIG. 5A-B may be applied to the two records to determine an association metric for the two records. Operations of FIGS. 5A-B may also be applicable to other types of attributes that are sub-dividable.

One or more embodiments include identifying a pair of records (Operation 502). A system identifies a pair of records. The records may be training records obtained at Operation 302 of FIG. 3. Alternatively, the records may be target records obtained at Operation 308 of FIG. 3. The pair of records includes a first record indicating a first set of full names for a first attribute and a second record indicating a second set of full names for a second attribute. Examples of operations for identifying a pair of records are described above with reference to Operation 402 of FIG. 4.

As an example, a system may identify two records. Record A may include a name attribute. The name attribute may be populated with an array of values, "Bill Smith," and "Samuel M. Anderson." Record B may include a name attribute. The name attribute may be populated with an array of values, "William Andrew Smith," "Janet Lee," and "Samuel M. Anderson."

The system may determine that a cardinality associated with Record A is two (two entries within the name attribute). The system may determine that a cardinality associated with Record B is three (two entries within the name attribute). The system may determine that a cardinality of Record A is smaller than a cardinality associated with Record B. The system may identify Record A as a "first record" and Record B as a "second record" such that the system iterates operations for determining individual association metrics with respect to each value of the name attribute of Record A, rather than Record B.

One or more embodiments include identifying a full name indicated by the first record as a "current full name" (Operation 504). The system identifies a first full name of the first set of full names. The first full name may be referred to as a "current full name."

One or more embodiments include comparing the given name of the current full name with each given name indicated in the second record to determine a first set of preliminary association metrics (Operation 506). The system divides each full name into a given name, a middle name, and a surname. A given name is extracted from a particular full name; a middle name is extracted from the particular full name; a surname is extracted from the particular full name. The system may apply various algorithms for subdividing a full name. As an example, the system may determine a number of words within a full name attribute. If there is only one word, then the word is assumed to be a surname. The given name and middle name are assumed to be blank. If there are two words, then the first word is assumed to be a given name and the second word is assumed to be a surname. The middle name is assumed to be blank. If there are three words, then the first word is assumed to be a given name, and the second word is assumed to be a middle name, and the third word is assumed to be a surname. A "word" as used within the above example refers to any consecutive string of characters. A "word" may refer to a full word (such as "William" or "Bill") or an initial (such as "W.").

The system compares the given name of the current full name with each given name indicated in the second record. The system may apply various algorithms for comparing two values to obtain a preliminary association metric. Examples of comparison algorithms are described above with reference to Operation 408.

The system determines a preliminary association metric for each comparison. The first set of preliminary association metrics, corresponding to the comparisons, represents a respective association level between the given name of the current full name and each given name indicated in the second record.

Referring to the example above, Record A and Record B each include a name attribute. The system may identify "Bill Smith" (of the name attribute of Record A) as a "current full name." The system may determine that "Bill" is a given name in "Bill Smith." The system may perform the following comparisons and obtain the following preliminary association metrics:

TABLE 2

| Comparison | Preliminary Association Metric |
|---|---|
| "Bill" and "William" | 73 |
| "Bill" and "Janet" | 0 |
| "Bill" and "Samuel" | 47 |

One or more embodiments include comparing the middle name of the current full name with each middle name indicated in the second record to determine a second set of preliminary association metrics (Operation 508). As described above, the system divides each full name into a given name, a middle name, and a surname. The system compares the middle name of the current full name with each middle name indicated in the second record. The system may apply various algorithms for comparing two values to obtain a preliminary association metric. Examples of comparison algorithms are described above with reference to Operation 408.

The system determines a preliminary association metric for each comparison. The second set of preliminary association metrics, corresponding to the comparisons, represents a respective association level between the middle name of the current full name and each middle name indicated in the second record.

Referring to the example above, Record A and Record B each include a name attribute. The system may identify "Bill Smith" (of the name attribute of Record A) as a "current full name." The system may determine that the middle name is blank within "Bill Smith" The system may perform the following comparisons and obtain the following preliminary association metrics:

TABLE 3

| Comparison | Preliminary Association Metric |
|---|---|
| [blank] and "Andrew" | 0 |
| [blank] and [blank] | 0 |
| [blank] and "M." | 0 |

One or more embodiments include comparing the surname of the current full name with each surname indicated in the second record to determine a third set of preliminary association metrics (Operation 510). As described above, the system divides each full name into a given name, a middle name, and a surname. The system compares the surname of the current full name with each surname indicated in the second record. The system may apply various algorithms for comparing two values to obtain a preliminary association metric. Examples of comparison algorithms are described above with reference to Operation 408.

The system determines a preliminary association metric for each comparison. The third set of preliminary association metrics, corresponding to the comparisons, represents a respective association level between the surname of the current full name and each surname indicated in the second record.

Referring to the example above, Record A and Record B each include a name attribute. The system may identify "Bill Smith" (of the name attribute of Record A) as a "current full name." The system may determine that "Smith" is a surname in "Bill Smith." The system may perform the following comparisons and obtain the following preliminary association metrics:

TABLE 4

| Comparison | Preliminary Association Metric |
|---|---|
| "Smith" and "Smith" | 100 |
| "Smith" and "Lee" | 0 |
| "Smith" and "Anderson" | 0 |

One or more embodiments include, based on the first, second, and third sets of preliminary association metrics, determining a current set of individual association metrics for each comparison between the current full name and a full name indicated by the second record (Operation 512). The system identifies a preliminary association metric from each of the first set of preliminary association metrics, the second set of preliminary association metrics, and the third set of preliminary association metrics, that corresponds to a same particular full name of the second set of full names. Based on the three preliminary association metrics, the system determines an individual association metric representing an association level between the current full name and the particular full name of the second set of full names. Iterating the process using the preliminary association metrics corresponding to each of the second set of full names, the system hence determines an individual association metric representing a respective association level between the current full name and each of the second set of full names.

Referring to the example above, Record A and Record B each include a name attribute. The system may determine the following preliminary association metrics for the full names indicated in Record A and Record B:

TABLE 5

| Comparison | First Set of Preliminary Association Metrics | Second Set of Preliminary Association Metrics | Third Set of Preliminary Association Metrics |
|---|---|---|---|
| "Bill Smith" and "William Andrew Smith" | 73 | 0 | 100 |
| "Bill Smith" and "Janet Lee" | 0 | 0 | 0 |
| "Bill Smith" and "Samuel M. Anderson" | 47 | 0 | 0 |

The system may apply a weighted average algorithm to the preliminary association metrics to determine an individual association metric. The weighted average algorithm may provide a greater weight for the surname, and a lesser weight for the middle name. The weighted average algorithm may be, for example:

0.35 × (preliminary association metric for given names) +

0.2 × (preliminary association metric for middle names) +

0.45 × (preliminary association metric for surnames).

For example, the system may compute the individual association metric for the comparison, "Bill Smith" and "William Andrew Smith," as follows:

0.35×73+0.2×0+0.45×100=70.55.

Hence, the system may determine the following individual association metrics:

TABLE 6

| Comparison | Individual Association Metric |
|---|---|
| "Bill Smith" and "William Andrew Smith" | 70.55 |
| "Bill Smith" and "Janet Lee" | 0 |
| "Bill Smith" and "Samuel M. Anderson" | 16.45 |

Additional and/or alternative algorithms for determining an individual association metric based on a preliminary association metric for given names, a preliminary association metric for middle names, and a preliminary association metric for surnames may be used.

One or more embodiments include reducing the current set of individual association metrics, across the second set of full names, to determine a current reduced association metric (Operation 514). Examples of operations for reducing a set of individual association metrics to determine a reduced association metric are described above with reference to Operation 410 of FIG. 4.

As an example, values being compared may be names. An individual association metric may represent a Jaro-Winkler distance between two names. A first-level reduction operation for reducing a set of individual association metrics may including selecting an individual association metric that represents the "best" match between two names. The individual association metric that represents the "best" match between two names is the maximum individual association metric out of the set of individual association metrics. Hence, the system may determine that the maximum individual association metric, out of the set of individual association metrics, is a reduced association metric.

One or more embodiments include storing the current reduced association metric into a set of reduced association metrics for the pair of records (Operation 516). Examples of operations for storing a reduced association metric into a set of reduced association metrics are described above with reference to Operation 412 of FIG. 4.

One or more embodiments include determining whether there are any more full names in the first set of full names to be processed (Operation 518). Examples of operations for determining whether there are any more values to be processed are described above with reference to Operation 414 of FIG. 4.

If there is at least one full name in the first set of full names to be processed, one or more embodiments include identifying a next full name of the first set of full names as the "current full name" (Operation 520). The system identifies a full name of the first set of full names that has not been processed as the "current full name."

The system then iterates Operations 506-516 with respect to the current full name. Hence, the system obtains a reduced association metric associated with each of the first set of full names. The system thereby compiles a set of reduced association metrics for the pair of records.

If there are no full names in the first set of full names to be processed, one or more embodiments include reducing the set of reduced association metrics, across the first set of full names, to determine an association metric for the pair of records (Operation 522). Examples of operations for reducing a set of reduced association metrics to determine an association metric, for a pair of records, that may be input into an ER model for determining whether the pair of records reference the same entity are described above with reference to Operation 418 of FIG. 4.

5. Example Embodiment

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 6A:
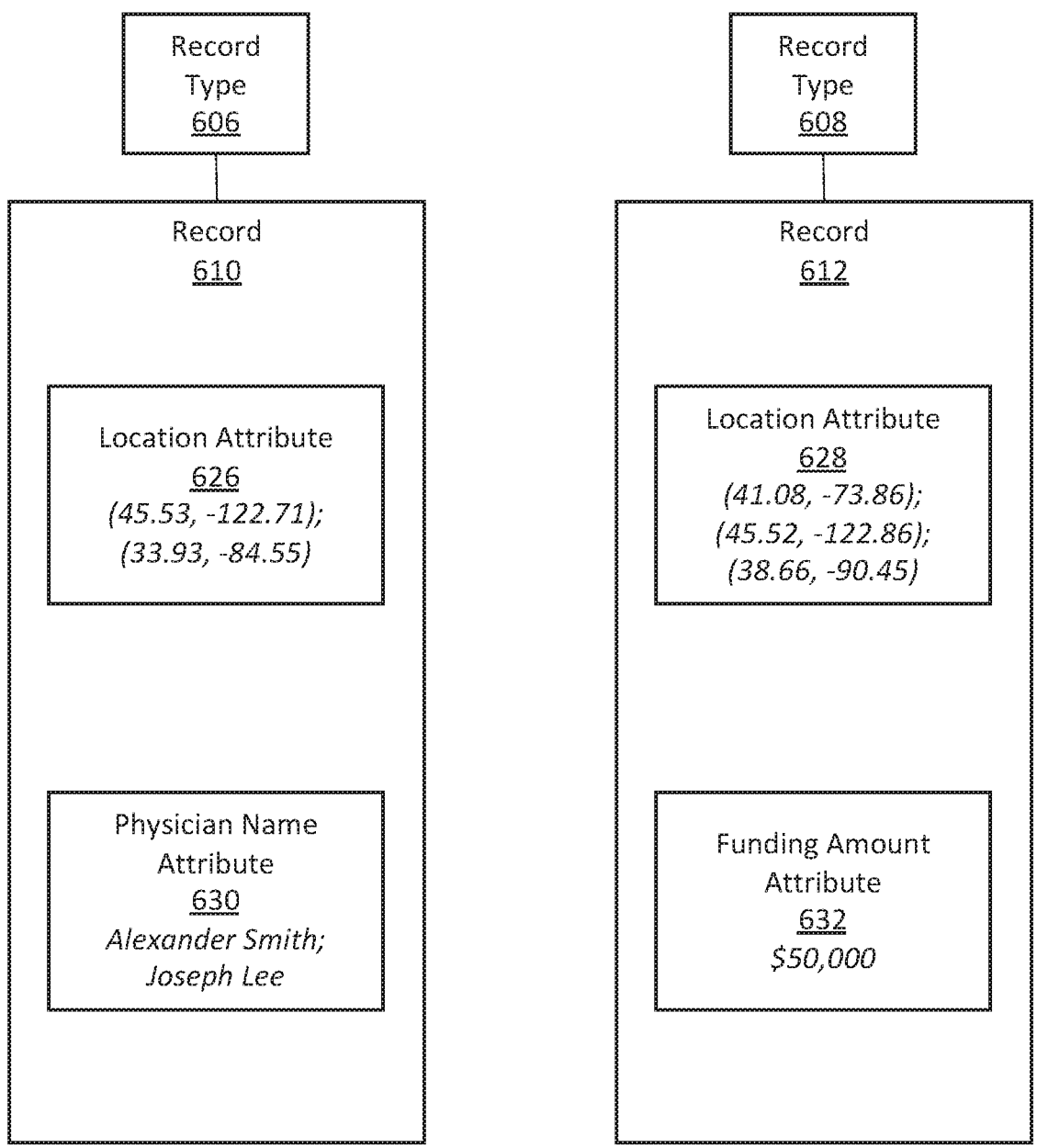
FIG. 6A illustrates examples of records, of different record types, that are associated with a same entity, in accordance with one or more embodiments.

FIG. 6A illustrates examples of records, of different record types, that are associated with a same entity, in accordance with one or more embodiments.

Record 610 and record 608 may be obtained from different data sources. Record 610 may be associated with record type 606. Record 608 may be associated with record type 608.

Record 610 includes a location attribute 626 and a physician name attribute 630. The locations within location attribute 626 are: (45.53, −122.71); (33.93, −84.55). The names within physician name attribute 630 are: Alexander Smith; Joseph Lee.

Record 612 includes a location attribute 628 and a funding amount attribute 632. The locations within location attribute 628 are: (41.08, −73.86); (45.52, −122.86); (38.66, −90.45). The amount within funding amount attribute 632 is: $50,000.

A system selects a value within location attribute 626, (45.53, −122.71), as a "current value." The system compares the current value with each of the values within location attribute 628 and determines an individual association metric for each comparison, as follows:

TABLE 7

| Comparison | Individual Association Metric |
| --- | --- |
| (45.53, −122.71) and (41.08, −73.86) | 49.05 |
| (45.53, −122.71) and (45.52, −122.86) | 0.15 |
| (45.53, −122.71) and (38.66, −90.45) | 32.98 |

The system reduces the individual association metrics across the values of location attribute 628. The system reduces the individual association metrics by determining a minimum individual association metric out of the individual association metrics. The system determines that a reduced association metric is thus 0.15.

The system determines that there is another value within location attribute 626 to be processed. The system selects (33.93, −84.55) as the "current value." The system compares the current value with each of the values within location attribute 628 and determines an individual association metric for each comparison, as follows:

TABLE 8

| Comparison | Individual Association Metric |
| --- | --- |
| (33.93, −84.55) and (41.08, −73.86) | 12.86 |
| (33.93, −84.55) and (45.52, −122.86) | 40.02 |
| (33.93, −84.55) and (38.66, −90.45) | 7.56 |

The system reduces the individual association metrics across the values of location attribute 628. The system reduces the individual association metrics by determining a minimum individual association metric out of the individual association metrics. The system determines that a reduced association metric is thus 7.56.

The system determines that there are no other values within location attribute 626 to be processed. Therefore the system has determined a set of reduced association metrics including: 0.15; 7.56.

The system reduces the set of reduced association metrics across the values of location attribute 626. The system reduces the set of reduced association metrics by determining a count of reduced association metrics that are below a threshold value of 5.00. The system determines that there is one reduced association metric that is below the threshold value of 5.00. The system normalizes the count by dividing the count by a number of combinations associated with the values of location attribute 626 and the values of location attribute 628. A cardinality associated with location attribute 626 is two. A cardinality associated with location attribute 628 is three. Therefore, the number of combinations associated with the values of location attribute 626 and the values of location attribute 628 is 2×3=6. Hence the system determines that the normalized count is ⅙=0.167. The system determines that an association metric for record 610 and record 612 is 0.167.

The system may determine additional association metrics for record 610 and record 612 based on other attributes of the records. The system inputs the association metrics into an entity resolution (ER) model. Hence, based at least on the association metric of 0.167 corresponding to location attribute 626 and location attribute 628, the ER model determines that record 610 and record 612 are associated with a same entity.

Figure 6B:
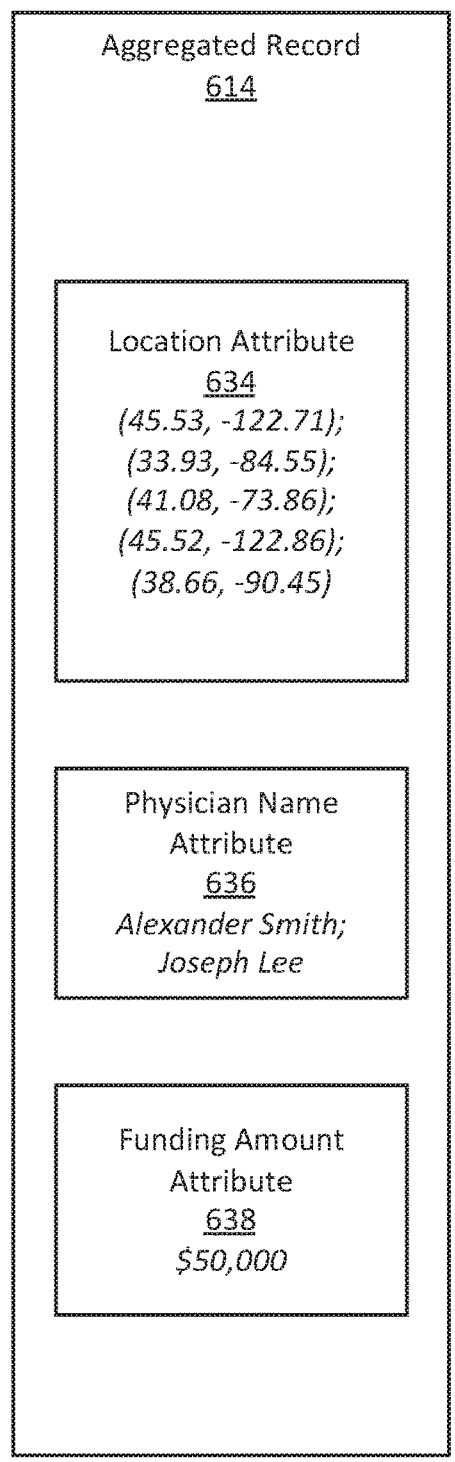
FIG. 6B illustrates an example of an aggregated record determined based on records, of different record types, that are associated with a same entity, in accordance with one or more embodiments.

FIG. 6B illustrates an example of an aggregated record determined based on records, of different record types, that are associated with a same entity, in accordance with one or more embodiments. Continuing the example above, since record 610 and record 612 are determined as being associated with the same entity, the system aggregates record 610 and record 612 to generate an aggregated record 614.

The system determines that location attribute 626 of record 610 and location attribute 628 of record 612 are associated with a same meaning. For example, both location attribute 626 of record 610 and location attribute 628 of record 612 may include information indicating work addresses of a physician. Hence, the system includes a location attribute 634 in aggregated record 614. The system merges the information of location attribute 626 and location attribute 628 into location attribute 634. Hence, location attribute 634 includes values from both location attribute 626 and location attribute 628, as follows: (45.53, −122.71); (33.93, −84.55); (41.08, −73.86); (45.52, −122.86); (38.66, −90.45).

The system determines that physician name attribute 630 of record 610 is not included in record 612. Hence, the system includes a physician name attribute 636 in aggregated record 614. The system copies the information of physician name attribute 630 into physician name attribute 636. Hence, physician name attribute 636 includes: Alexander Smith; Joseph Lee.

The system determines that funding amount attribute 632 of record 612 is not included in record 610. Hence, the system includes a funding amount attribute 638 in aggregated record 614. The system copies the information of funding amount attribute 632 into funding amount attribute 638. Hence, funding amount attribute 638 includes: $50,000.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
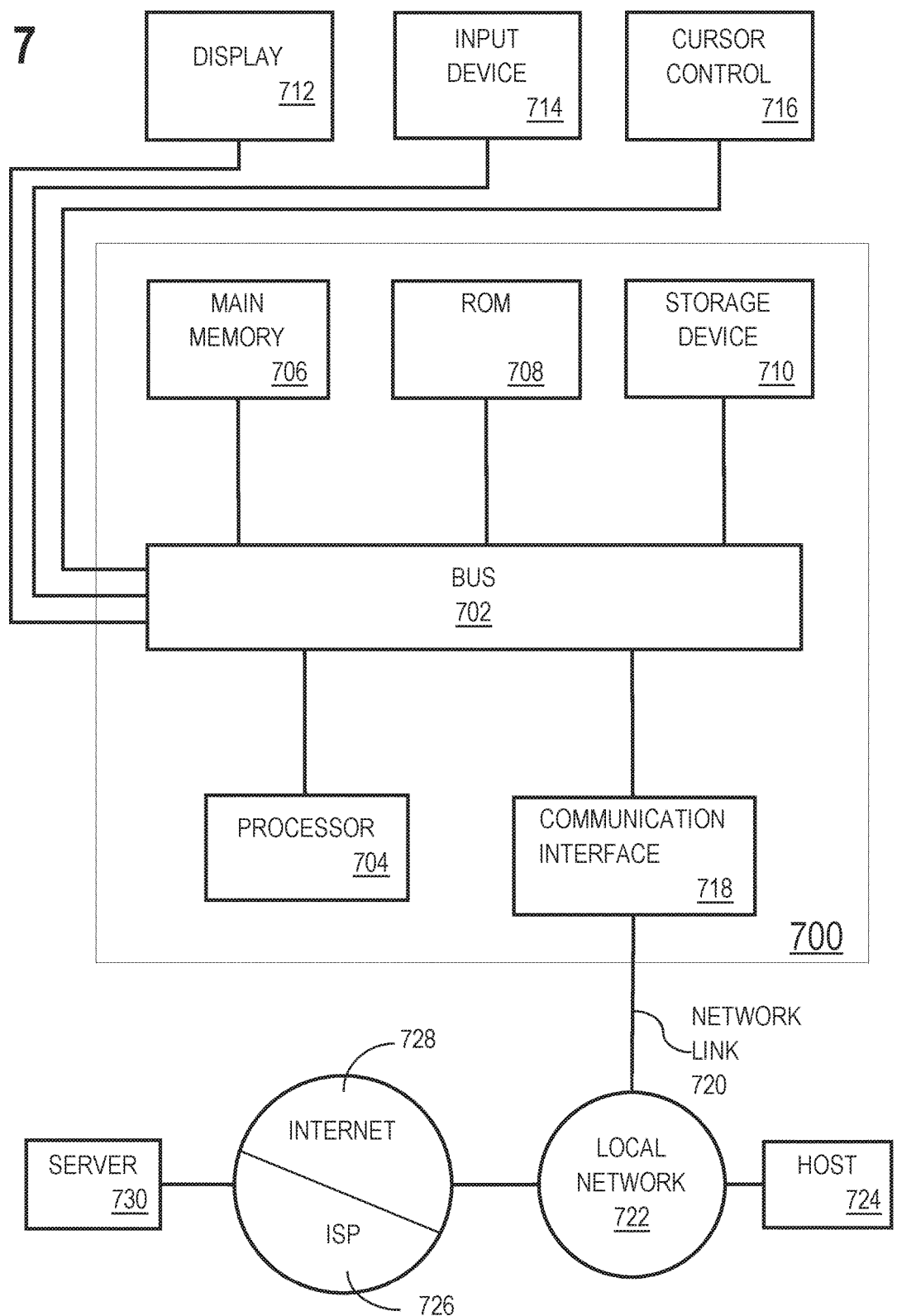
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by at least one processor, the method comprising:
   obtaining pairs of training records for training an entity resolution model, wherein the pairs of training records comprise a first pair of training records, wherein the first pair of training records comprises a first record that indicates a first set of values for a first attribute and a second record that indicates a second set of values for the first attribute;
   determining a set of association metrics corresponding to the pairs of training records at least by:
   identifying a first value of the first set of values;
   determining a first set of individual association metrics corresponding respectively to comparisons between the first value of the first set of values and each value of the second set of values;
   executing a first-level reduction operation for the first set of individual association metrics, across the second set of values, to generate a first reduced association metric;
   storing the first reduced association metric in a set of reduced association metrics;
   identifying a second value of the first set of values;
   determining a second set of individual associate metrics corresponding respectively to comparisons between the second value of the first set of values and each value of the second set of values;
   executing the first-level reduction operation for the second set of individual association metrics, across the second set of values, to generate a second reduced association metric;
   storing the second reduced association metric in the set of reduced association metrics;
   excluding the first value and the second value, determining a presence of any more values in the first set of values;
   based on determining that no more values are present in the first set of values, executing a second-level reduction operation for the set of reduced association metrics across the first set of values to generate a set of association metrics corresponding to the first pair of training records; and
   applying a machine learning algorithm to the set of association metrics corresponding to the pairs of training records to train the entity resolution model.

2. The method of claim 1, wherein the first attribute comprises a physical location.

3. The method of claim 1, wherein determining the first set of individual association metrics corresponding respectively to the comparisons between the first value of the first set of values and each of the second set of values comprises:
   determining physical distances between the first value and each of the second set of values; and
   identifying the physical distances as the first set of individual association metrics.

4. The method of claim 1, wherein executing the second-level reduction operation for the set of reduced association metrics comprises:
   determining a count of any of the set of reduced association metrics that does not satisfy a criteria; and
   normalizing the count based on at least one of a first cardinality associated with the first set of values and a second cardinality associated with the second set of values.

5. The method of claim 1, wherein executing the first-level reduction operation for the first set of individual association metrics comprises at least one of:
   determining a minimum value from the first set of individual association metrics;
   determining a maximum value from the first set of individual association metrics; and
   determining an average value of the first set of individual association metrics.

6. The method of claim 1, wherein the entity resolution model comprises a random forest model.

7. The method of claim 1, further comprising:
   applying the entity resolution model to target association metrics for a pair of target records to determine a classification of the pair of target records as being associated with a same entity or being associated with different entities.

8. The method of claim 7, further comprising:
determining that the pair of target records comprises a third record and a fourth record, wherein a first piece of information is indicated by the third record and not indicated by the fourth record; and
responsive to determining that the pair of target records are associated with the same entity, aggregating information indicated by the pair of target records as a set of information associated with the entity, wherein the set of information associated with the entity comprises the first piece of information.

9. The method of claim 8, further comprising:
receiving a user request for information associated with the entity, wherein the user request does not identify the third record; and
responsive to the user request, presenting, on a user interface, the set of information associated with the entity, the set of information associated with the entity comprising the first piece of information.

10. The method of claim 7, further comprising:
determining the target association metrics corresponding to the pair of target records at least by:
  determining the pair of target records comprises a third record that indicates a third set of values for the first attribute and a fourth record that indicates a fourth set of values for the first attribute;
  determining a third set of individual association metrics corresponding respectively to comparisons between a third value of the third set of values and each of the fourth set of values;
  determining a fourth set of individual association metrics corresponding respectively to comparisons between a fourth value of the third set of values and each of the second set of values;
  executing the first-level reduction operation for the third set of individual association metrics, across the fourth set of values, to generate a third reduced association metric;
  executing the first-level reduction operation for the fourth set of individual association metrics, across the fourth set of values, to generate a fourth reduced association metric; and
  executing the second-level reduction operation for at least the third reduced association metric and the fourth reduced association metric, across the third set of values, to generate a first target association metric, of the target association metrics, corresponding to the pair of target records.

11. The method of claim 7, wherein applying the entity resolution model to the target association metrics for the pair of target records to determine the classification of the pair of target records as being associated with a same entity or being associated with different entities comprises:
  applying the entity resolution model to the target association metrics for the pair of target records to determine a probability that the pair of target records are associated with the same entity; and
  performing one of:
    responsive to determining that the probability is above a threshold value, determining the pair of target records as being associated with the same entity; or
    responsive to determining that the probability is below the threshold value, determining the pair of target records as being associated with different entities.

12. A computer system comprising:
a hardware processor configured to:
  obtain pairs of training records for training an entity resolution model, wherein the pairs of training records comprise a first pair of training records, wherein the first pair of training records comprises a first record that indicates a first set of values for a first attribute and a second record that indicates a second set of values for the first attribute;
  determine a set of association metrics corresponding to the pairs of training records at least by being configured to:
    identify a first value of the first set of values;
    determine a first set of individual association metrics corresponding respectively to comparisons between the first value of the first set of values and each value of the second set of values;
    execute a first-level reduction operation for the first set of individual association metrics, across the second set of values, to generate a first reduced association metric;
    store the first reduced association metric in a set of reduced association metrics;
    identify a second value of the first set of values;
    determine a second set of individual associate metrics corresponding respectively to comparisons between the second value of the first set of values and each value of the second set of values;
    execute the first-level reduction operation for the second set of individual association metrics, across the second set of values, to generate a second reduced association metric;
    store the second reduced association metric in the set of reduced association metrics:
    exclude the first value and the second value, determining a presence of any more values in the first set of values;
    based on determining that no more values are present in the first set of values, execute a second-level reduction operation for the set of reduced association metrics across the first set of values to generate a set of association metrics corresponding to the first pair of training records; and
  apply a machine learning algorithm to the set of association metrics corresponding to the pairs of training records to train the entity resolution model.

13. The computer system of claim 12, wherein the hardware processor being configured to execute the second-level reduction operation for the set of reduced association metric further comprises the hardware processor being configured to:
  determine a count of any of the set of reduced association metrics that does not satisfy a criteria; and
  normalize the count based on at least one of a first cardinality associated with the first set of values and a second cardinality associated with the second set of values.

14. The computer system of claim 12, wherein the hardware processor is further configured to:
  apply the entity resolution model to target association metrics for a pair of target records to determine a classification of the pair of target records as being associated with a same entity or being associated with different entities.

15. A method performed by at least one processor, the method comprising:

obtaining pairs of training records for training an entity resolution model, wherein the pairs of training records comprise a first pair of training records, wherein the first pair of training records comprises a first record that indicates a first set of values, including a first value, for a first attribute and a second record that indicates a second set of values, including a second value, for the first attribute;

extracting, from the first set of values, a third set of values for a first portion of the first attribute and a fourth set of values for a second portion of the first attribute, wherein a third value, of the third set of values, and a fourth value, of the fourth set of values, is extracted from the first set of values for the first attribute;

extracting, from the second set of values, a fifth set of values for the first portion of the first attribute and a sixth set of values for the second portion of the first attribute;

determining a set of association metrics corresponding to the pairs of training records at least by:

determining a first set of preliminary association metrics corresponding respectively to comparisons between the third value, of the third set of values, and each value of the fifth set of values;

determining a second set of preliminary association metrics corresponding respectively to comparisons between the fourth value, of the fourth set of values, and each value of the sixth set of values;

based on at least the first set of preliminary association metrics and the second set of preliminary association metrics, determining a first set of individual association metrics corresponding respectively to comparisons between the first value and each value of the second set of values;

executing a first-level reduction operation for the first set of individual association metrics, across the second set of values, to generate a first reduced association metric;

storing the first reduced association metric in a set of association metrics;

executing the first-level reduction operation for a second set of individual association metrics, across the second set of values, to generate a second reduced association metric;

storing the second reduced association metric in the set of association metrics;

determining a presence of any more values in the first set of values;

based on a determination that no more values are present in the first set of values, executing a second-level reduction operation for the set of reduced association metrics to generate a set of association metrics corresponding to the first pair of training records;

applying a machine learning algorithm to the set of association metrics corresponding to the pairs of training records to train the entity resolution model; and applying the entity resolution model to target association metrics for a pair of target records to determine a classification of the pair of target records as being associated with a same entity or being associated with different entities.

16. The method of claim 15, wherein:
the first portion of the first attribute comprises a given name attribute; and
the second portion of the first attribute comprises a surname attribute.

17. The method of claim 15, wherein determining the first set of individual association metrics corresponding respectively to comparisons between the first value and each of the second set of values comprises:
determining weighted averages based on at least the first set of preliminary association metrics and the second set of preliminary association metrics.

18. The method of claim 15, wherein determining the first set of preliminary association metrics corresponding respectively to comparisons between the third value, of the third set of values, and each of the fifth set of values comprises:
determining Jaro-Winkler distances between the third value and each of the fifth set of values; and
identifying the Jaro-Winkler distances as the first set of preliminary association metrics.

19. The method of claim 15, wherein executing the second-level reduction operation for the at least the first reduced association metric and the second reduced association metric comprises:
determining a count of any of the at least the first reduced association metric and the second reduced association metric that does not satisfy a criteria; and
normalizing the count based on at least one of a first cardinality associated with the first set of values and a second cardinality associated with the second set of values.

20. The method of claim 15, wherein executing the first-level reduction operation for the first set of individual association metrics comprises at least one of:
determining a minimum value from the first set of individual association metrics;
determining a maximum value from the first set of individual association metrics; or
determining an average value of the first set of individual association metrics.

* * * * *